United States Patent
Jiang et al.

(10) Patent No.: US 10,639,768 B2
(45) Date of Patent: May 5, 2020

(54) MULTI-LAYER COATING WITH CUBIC BORON NITRIDE PARTICLES

(75) Inventors: Wenping Jiang, Fayetteville, AR (US); Ajay P. Malshe, Springdale, AR (US)

(73) Assignee: P&S Global Holdings LLC, Houston, TX (US)

( * ) Notice: Subject to any disclaimer, the term of this patent is extended or adjusted under 35 U.S.C. 154(b) by 382 days.

(21) Appl. No.: 14/119,799

(22) PCT Filed: May 29, 2012

(86) PCT No.: PCT/US2012/039894
§ 371 (c)(1),
(2), (4) Date: Mar. 20, 2014

(87) PCT Pub. No.: WO2012/166747
PCT Pub. Date: Dec. 6, 2012

(65) Prior Publication Data
US 2014/0308511 A1    Oct. 16, 2014

Related U.S. Application Data

(60) Provisional application No. 61/490,719, filed on May 27, 2011, provisional application No. 61/490,730, filed on May 27, 2011.

(51) Int. Cl.
*C23C 30/00* (2006.01)
*B24D 3/06* (2006.01)
(Continued)

(52) U.S. Cl.
CPC .............. *B24D 3/06* (2013.01); *B23B 27/141* (2013.01); *B23B 27/143* (2013.01);
(Continued)

(58) Field of Classification Search
CPC .... B24D 3/06; B24D 18/0009; B23B 27/148; B23B 27/143; B23B 27/141;
(Continued)

(56) References Cited

U.S. PATENT DOCUMENTS

| 4,526,673 A | 7/1985 | Little et al. |
| 4,681,486 A | 7/1987 | Hale |

(Continued)

FOREIGN PATENT DOCUMENTS

| JP | 2909248 B2 | 11/1992 |
| WO | 96/35820 A1 | 11/1996 |

OTHER PUBLICATIONS

Extended European Search Report for Application No. 12793589.8 (dated Feb. 2, 2015).

(Continued)

*Primary Examiner* — Cheng Yuan Huang
(74) *Attorney, Agent, or Firm* — Robert Devin Ricci; Richard Lee Vail; Kean Miller LLP

(57) ABSTRACT

A physical configuration of multiple-layer coatings formed with at least one layer of coating containing cubic born nitride (cBN) particles with one or more layers in composite form containing cBN particles may have a thickness of each individual layer as thin as in the nanometer range, or as thick as in the range of a few microns and even up to tens of microns. The chemistry of the composite layer consists of any individual phase of (a) nitrides such as titanium nitride (TiN), titanium carbonitride (TiCN), and hafnium nitride (HfN); (b) carbides such as titanium carbide (TiC); and (c) oxides such as aluminum oxide ($Al_2O_3$) or any combination of the above phases, in addition to cBN particles. The coating or film can be stand-alone or on a substrate.

3 Claims, 1 Drawing Sheet

(51) Int. Cl.
*B23B 27/14* (2006.01)
*C23C 28/04* (2006.01)
*C04B 35/5831* (2006.01)
*B24D 18/00* (2006.01)

(52) U.S. Cl.
CPC ........ *B23B 27/148* (2013.01); *B24D 18/0009* (2013.01); *C04B 35/5831* (2013.01); *C23C 28/044* (2013.01); *C23C 30/005* (2013.01); *B23B 2200/081* (2013.01); *B23B 2200/087* (2013.01); *B23B 2200/204* (2013.01); *B23B 2200/205* (2013.01); *B23B 2228/10* (2013.01); *C04B 2235/3217* (2013.01); *C04B 2235/3843* (2013.01); *C04B 2235/3856* (2013.01); *C04B 2235/3886* (2013.01); *C04B 2235/604* (2013.01); *C04B 2235/614* (2013.01); *C04B 2235/665* (2013.01); *C04B 2235/667* (2013.01); *Y10T 407/24* (2015.01); *Y10T 407/27* (2015.01); *Y10T 428/265* (2015.01)

(58) Field of Classification Search
CPC ........ B23B 2200/087; B23B 2200/204; B23B 2200/205; B23B 2200/081; B23B 2228/10; C04B 35/5831; C04B 2235/665; C04B 2235/604; C04B 2235/3843; C04B 2235/614; C04B 2235/3886; C04B 2235/667; C04B 2235/3217; C04B 2235/3856; C23C 28/044; C23C 30/005
See application file for complete search history.

(56) References Cited

U.S. PATENT DOCUMENTS

| | | |
|---|---|---|
| 5,670,252 A | 9/1997 | Makowiecki et al. |
| 5,897,751 A | 4/1999 | Makowiecki et al. |
| 5,928,771 A | 7/1999 | Dewald, Jr. et al. |
| 6,054,185 A | 4/2000 | Inspektor |
| 6,599,062 B1 | 7/2003 | Oles et al. |
| 6,790,543 B2 | 9/2004 | Kubota et al. |
| 7,264,883 B2 | 9/2007 | Yamamoto et al. |
| 8,003,232 B2 * | 8/2011 | Johansson ........... C23C 14/0641 428/216 |
| 2002/0112408 A1 * | 8/2002 | Rolander ................ C22C 1/051 51/307 |
| 2005/0210755 A1 | 9/2005 | Cho et al. |
| 2006/0199013 A1 | 9/2006 | Malshe et al. |
| 2007/0175103 A1 | 8/2007 | Sigalas et al. |
| 2008/0302023 A1 | 12/2008 | Goudemond et al. |
| 2010/0069225 A1 | 3/2010 | Kountanya et al. |
| 2010/0260560 A1 * | 10/2010 | Schier ................ C23C 14/0036 407/119 |
| 2010/0288817 A1 | 11/2010 | Yao |
| 2011/0020081 A1 | 1/2011 | Webb et al. |

OTHER PUBLICATIONS

English translation of Office action in Japanese Patent Application No. 2014-512188 (dated May 24, 2016).

Communication pursuant to Article 94(3) EPC for application No. 12793589.8 (dated Dec. 23, 2016).

\* cited by examiner

MULTI-LAYER COATING WITH CUBIC BORON NITRIDE PARTICLES

CROSS-REFERENCE TO RELATED APPLICATIONS

This application claims priority from U.S. provisional patent application No. 61/490,730, filed May 27, 2011, and entitled "Multiple-Layer Coating and/or Film Configuration Consisting of Cubic Boron Nitride (cBN) Particles"; and U.S. provisional patent application No. 61/490,719, also filed May 27, 2011, and entitled "Fabrication Process for Thick Cubic Boron Nitride (cBN) and Other Ceramic Based Coating and Film." Such applications are incorporated by reference as if set forth fully herein.

STATEMENT REGARDING FEDERALLY SPONSORED RESEARCH OR DEVELOPMENT

Not applicable.

BACKGROUND OF THE INVENTION

Coatings are effective for improving the performance of various materials, such as for achieving better wear resistance and corrosion resistance. Common applications where a coating is applied to a substrate to improve wear resistance of the substrate material include cutting tool inserts for the cutting of hard materials, such as steel. Common substrate materials for cutting tools may include, for example, hard metals of different particle sizes with a varied percentage of cobalt or nickel as a binder material.

Boron nitride (BN) is a well-known material that, due to its thermal and chemical stability, is widely used in the fabrication of parts for high-temperature applications. It exists amorphously and in several crystalline forms. Cubic boron nitride (cBN) is a crystalline form that, due to its very high hardness value and relatively low cost, is widely used in various cutting applications as an abrasive. Since it is relatively insoluble in iron, nickel, and related alloys at high temperature, it is widely used in place of diamond for the cutting and machining of steel.

The art also includes various methods of coating parts, such as inserts for cutting tools and machines, with layers of cBN. The process used has been the application of cBN in pure, non-composite phase. This application of a pure cBN layer by vapor depositions is made with a coating thickness limited to less than about 2 to 3 microns. It has been found, however, that such a coating configuration has limitations for delivering multiple-functional requirements such as toughness, thermal stability, and wear resistance. These parameters are of critical importance in certain applications, such as in coatings for cutting tool inserts, and for this reason an improved coating material is with better toughness, thermal stability, and wear resistance is desired.

BRIEF SUMMARY OF THE INVENTION

This invention relates to a physical configuration of multiple-layer coatings formed with at least one layer of coating containing cubic born nitride (cBN) particles in a composite rather than in a pure form. Specifically, the coating is in stacked structure (one layer on the top of another layer) with one or more layers in composite form containing cBN particles. In various embodiments, the number of the layers can be any integer more than one. The thickness of each individual layer can be, but not limited to, as thin as in the nanometer range, or as thick as in the range of a few microns and even up to tens of microns. The chemistry of the composite layer consists of any individual phase of (a) nitrides such as titanium nitride (TiN), titanium carbonitride (TiCN), and hafnium nitride (HfN); (b) carbides such as titanium carbide (TiC); and (c) oxides such as aluminum oxide ($Al_2O_3$) or any combination of the above phases, in addition to cBN particles. The coating or film can be stand-alone or on the substrate(s) of interest.

The coating configuration delivers combinatorial functions including good thermal stability, toughness, and wear resistance. The coating presents opportunities for advanced manufacturing, wear-resistant tools, and other applications.

In a first aspect, the invention is directed to a multi-layer coated substrate, comprising a substrate material chosen from the set consisting of ceramics, polycrystalline cubic boron nitride (PCBN) compacts, PCBN tips, cermets, and steels, a composite layer comprising cubic boron nitride (cBN) particles and particles comprising a second material, wherein the second material is chosen from the set consisting of nitrides, carbides, carbonitrides, borides, carbon, and oxides; and a ceramic layer adjacent to the composite layer, the ceramic layer comprising a third material chosen from the set consisting of nitrides, carbides, carbonitrides, borides, carbon, and oxides.

In a second aspect, the invention is directed to a method of forming a multi-layer coated substrate, comprising the steps of spraying a first material comprising cBN particles as a coating preform on the substrate, infiltrating a second material wherein the second material is chosen from the set consisting of nitrides, carbides, carbonitrides, borides, carbon, and oxides into the first material by a chemical vapor infiltration (CVI) process to create a composite cBN particle layer, bonding the cBN composite layer by a method selected from the set consisting of microwave sintering, infrared (IR) heating, laser radiation, and a hybrid process, and spraying a third material onto the cBN composite layer to form a ceramic layer, wherein the third material comprises at least one material chosen from the set consisting of nitrides, carbides, carbonitrides, borides, carbon, and oxides.

In a third aspect, the invention is directed to a method of forming a multi-layer coated substrate, comprising the steps of spraying a first ceramic material onto the substrate to form a ceramic layer, wherein the ceramic material comprises at least one of nitrides, carbides, carbonitrides, borides, carbon, and oxides, spraying cBN particles onto the ceramic layer, infiltrating a second ceramic material into the cBN particles wherein the second ceramic material is chosen from the set consisting of nitrides, carbides, carbonitrides, borides, carbon, and oxides, and wherein the infiltration step is performed by a chemical vapor infiltration (CVI) process to create a composite cBN particle layer, and bonding the cBN composite layer by a method selected from the set consisting of microwave sintering, infrared (IR) heating, laser radiation, and a hybrid process.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

According to various embodiments of the present invention as used in connection with a coated substrate, the coating configuration may be: (1) a cBN-based composite coating in repetitive units with a ceramic layer as interfacial layer; (2) a cBN-based composite coating with different binder phases stacked in layered form on the composite coating; and (3) a cBN-based composite coating together with other layers of individual or combinatorial ceramic phases. In each case, the inventors have found that the resulting coated substrate provides enhanced performance with respect to wear resistance and tool life compared to previous coated substrates that incorporate cBN as a coating material, particular such tools as are used for cutting steel.

Figure 1:
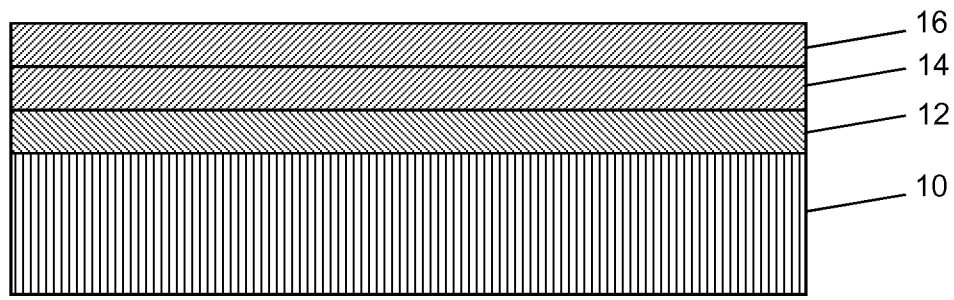
FIG. 1 is an illustration of a substrate with multiple coatings according to a first preferred embodiment of a coated substrate according to the present invention.

With reference to FIG. 1, a first preferred embodiment of the present invention for use in connection with a cutting tool insert may be described. Substrate 10 may be any material appropriate to the application, such as a ceramic material, a carbide, PCBN compacts or tips, cermet, or steel. For carbides, they can be any substrate with particle size from nano- to micro-sized range with 2%~14% Co or Ni as binder. Further, the carbides include any substrates with alloy phases such as TaC and TiC. For ceramics, they can be nitrides such as $Si_3N_4$ of alpha and beta phases, oxides such as $Al_2O_3$ with or without TiC, and enhancing agents such as SiC whiskers. The first coating layer on substrate 10 is layer 12, which is a composite layer comprising cBN particles, ranging from nanometer to microns, preferably in the range of 100 nm to 4000 nm. The composite may include, in addition to the cBN particles, various nitrides, carbides, carbonitrides, borides, and oxides in ratio of materials ranging from 20% to 60%, depending upon applications. Layer 14 is first stacked ceramic layer, which may be formed of nitrides, carbides, carbonitrides, oxides, or any combination of these materials. Layer 16 is a second stacked ceramic layer. It should be understood that in various embodiments, there may be only a single stacked ceramic layer, or there may be more than two of these layers. Further, the invention also includes in other embodiments multiple repetitions of this structure, such as, for example, two groupings of layers one over the other, where each grouping comprises a composite cBN layer 12 and first and second stacked ceramic layers, with the thickness of each layer ranging from 200 nm to 10 microns.

Figure 2:
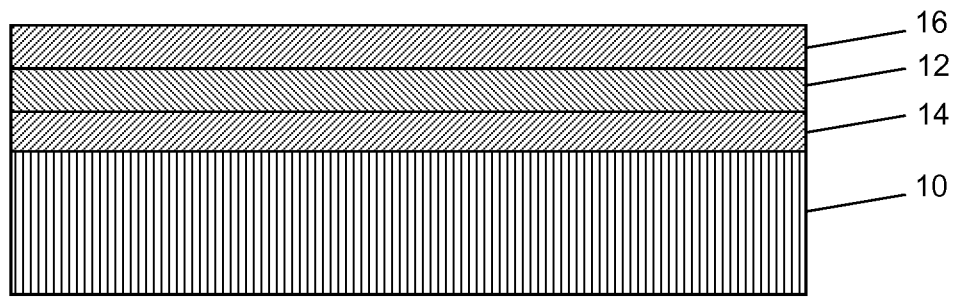
FIG. 2 is an illustration of a substrate with multiple coatings according to a second preferred embodiment of a coated substrate according to the present invention.

Referring now to FIG. 2, a second preferred embodiment of the invention may be described where the ordering of layers has been modified. In this embodiment, the composite cBN layer 12 has been deposited between the first and second ceramic layers 14 and 16. The composite cBN layer 12 thus serves as an interfacial layer between first and second ceramic layers 14 and 16. Depending on the coating chemistry, with this coating configuration, it can modify the tool wear profile.

The coating configuration form can be produced by sequential processes including, but not limited to, (A) spray deposition of cBN particles as a coating preform, and followed by chemical vapor infiltration of ceramic phase(s), then repeating the deposition and infiltration process; (B) vapor deposition (either physical vapor deposition or chemical vapor deposition or both) to create layers of ceramic phases, then spray or deposition of cBN particles, followed by chemical vapor infiltration of ceramic phase(s); (C) molding or compacting method at HP-HT conditions. In spray deposition of cBN particles of 100 nm to 5000 nm, coating preform thickness can be up to a few tens of microns. In chemical vapor infiltration, the temperature is in the range of 850° C. to 1100° C., with infiltration time between 120 minutes and 2400 minutes. Each layer may be bonded by microwave sintering, infrared (IR) heating, laser radiation, or any combination of the above.

This invention, as illustrated and described herein, can be used for cutting tools, such as for inserts used for cutting tools and machines. It may also, however, be applied to other applications, where wear resistance, erosion prevention, or corrosion protection, or thermal protection are desired qualities.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A multi-layer coated substrate, consisting of:
   a. a substrate formed of a substrate material chosen from the set consisting of carbides, ceramics, polycrystalline cubic boron nitride (PCBN) compacts, PCBN tips, cermets, carbon, and steels;
   b. a composite layer deposited on the substrate, the composite layer consisting of cubic boron nitride (cBN) particles and a second material chosen from the set consisting of nitrides, carbides, carbonitrides, borides, and oxides;
   c. a first stacked ceramic layer deposited on the composite layer, the first stacked ceramic layer consisting of a third material chosen from the set consisting of nitrides, carbides, carbonitrides, oxides, or any combination thereof; and
   d. a second stacked ceramic layer deposited on the first stacked ceramic layer, the second stacked ceramic layer consisting of a fourth material chosen from the set consisting of nitrides, carbides, carbonitrides, oxides, or any combination thereof, wherein the third material and fourth material are different.

2. The multi-layer coated substrate of claim 1, wherein the cBN particles in the composite layer make up 20% to 60% of the composite layer.

3. The multi-layer coated substrate of claim 2, wherein each of the composite layer, first stacked ceramic layer, and second stacked ceramic layer comprise a thickness in the range of 200 nm to 10 μm.

* * * * *